Figure 1:
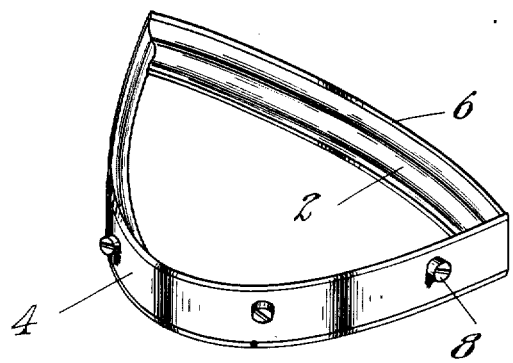

M. B. KAVEN.
METHOD OF MAKING DIES.
APPLICATION FILED MAY 17, 1909.

1,095,116.

Patented Apr. 28, 1914.
4 SHEETS—SHEET 1.

WITNESSES
Elizabeth C. Coufe
Edith C. Holbrook

INVENTOR
Moses B. Kaven
By his Attorney,
Nelson W. Howard

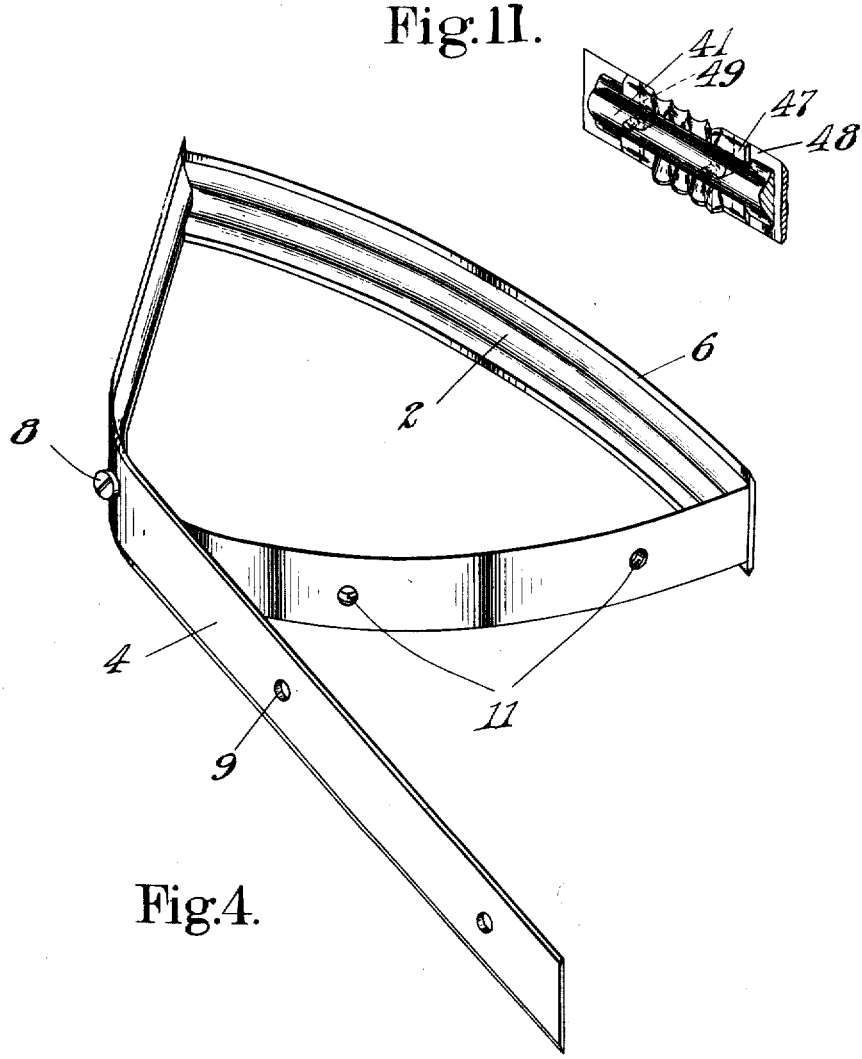

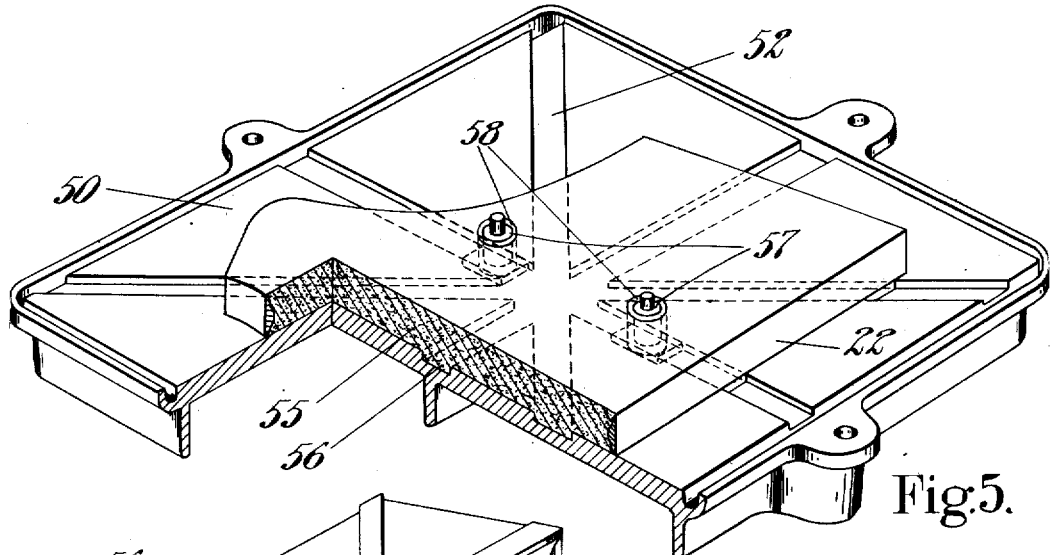
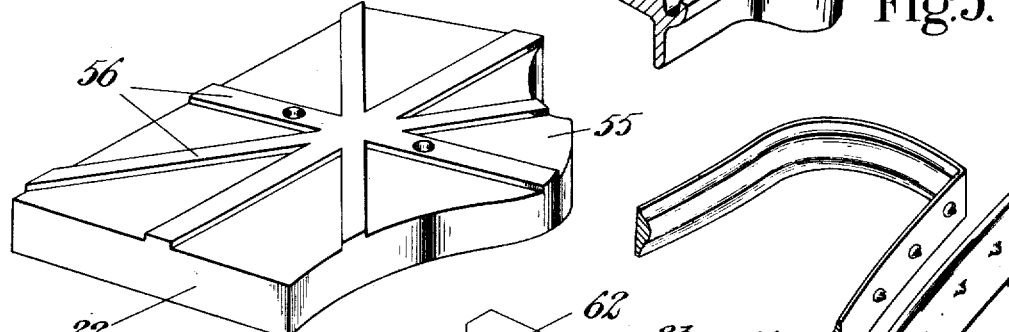
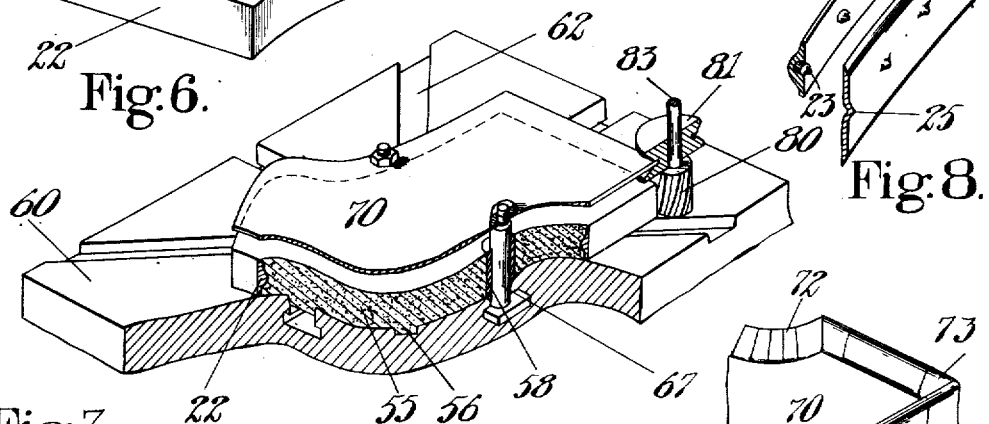
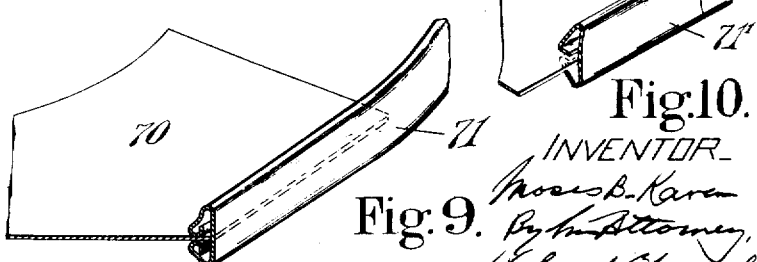
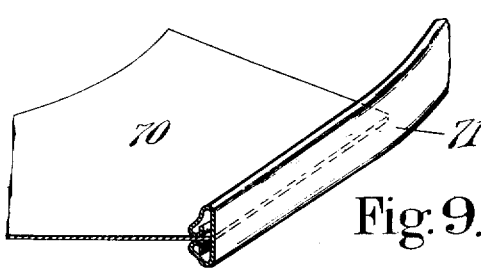

M. B. KAVEN.
METHOD OF MAKING DIES.
APPLICATION FILED MAY 17, 1909.

1,095,116.

Patented Apr. 28, 1914.
4 SHEETS—SHEET 4.

WITNESSES
Elizabeth C. Coyle
Edith C. Holbrook

INVENTOR
Moses B. Kaven
By his Attorney,
Nelson W. Howard

UNITED STATES PATENT OFFICE.

MOSES B. KAVEN, OF BEVERLY, MASSACHUSETTS, ASSIGNOR TO UNITED SHOE MACHINERY COMPANY, OF PATERSON, NEW JERSEY, A CORPORATION OF NEW JERSEY.

METHOD OF MAKING DIES.

1,095,116. Specification of Letters Patent. Patented Apr. 28, 1914.

Application filed May 17, 1909. Serial No. 496,545.

*To all whom it may concern:*

Be it known that I, MOSES B. KAVEN, a citizen of the United States, residing at Beverly, in the county of Essex and State of Massachusetts, have invented certain Improvements in Methods of Making Dies, of which the following description, in connection with the accompanying drawings, is a specification, like reference characters on the drawings indicating like parts in the several figures.

This invention relates to methods of making dies of the class used for cutting blanks from thin sheet material such as upper leather for boots and shoes and contemplates a convenient method whereby dies of accurate outline may be produced at a small cost.

More particularly the invention relates to dies adapted for use with clicking presses to die out various parts of the uppers of boots and shoes and contemplates an improved method of making that type of die which comprises a skeleton frame with one or more cutting blades secured to it.

A die of this type is desirable because it may be made rigid and free from tendency to spring out of shape and yet be of comparatively light weight so that it is not likely to scratch and mar the surface of the stock in being moved about over it. Furthermore, its substantially open center permits the workman to have an unobstructed view of the blank about to be cut out so that imperfections in the leather may be detected and avoided.

Another advantage incident to this type of die is that its cutting edges may be resharpened without danger of departing from the original outline, the outline being permanently determined by the contour of the frame to which the cutting blades are attached.

The primary object of the present invention is, accordingly, a method of manufacturing such dies accurately, conveniently and at a minimum of expense.

In constructing a die of the type referred to all forging of the cutting blades is avoided, which is an important advantage. The frame may be shaped accurately to templet independently of the cutting blades, which are secured thereto after the shape of the frame has been permanently determined. Moreover, having once constructed and shaped the frame, double edged cutting blades may be mounted thereon as easily as single edged blades, whereby a double edged die may be produced at practically the cost of the single edged die.

Further advantages incident to the method of this invention arise from the fact that the step of shaping the frame, and consequently determining the cutting outline of the die, may be effected by the use of machine tools thereby eliminating hand work upon the dies in a large measure. This method also obviates the danger of irreparably damaging an entire die in process of construction since the various parts of the die may be replaced if defective. The method also facilitates the step of sharpening the cutting edge since it renders it unnecessary to devote any attention to maintaining the outline of the die during the sharpening operation, the latter having been determined once for all in shaping the frame.

As herein disclosed the die frame is formed by a casting and an important step in the present method, whereby the cost of producing dies is greatly reduced, consists in utilizing as part of the pattern the templet which must of necessity be constructed for each die. Several different ways in which the templet may be utilized in this manner will be described at length hereinafter and by all of them it will be seen that the expense of constructing a wooden pattern is not only avoided but a pattern of superior accuracy is produced.

Another important step of the present method relates to the operation of bringing the contour of the frame into accordance with the outline of the templet. This step is carried out by the aid of a profiling machine in which the rough frame is located by means of a novel mounting which besides serving as a convenient and accurate means for holding and positioning the frame in a profiling machine also serves to determine the proper location of the templet with respect to the frame and, further, prevents distortion of the frame during the profiling operation.

Having completed the frame the next step in the method consists in securing the cutting blades to the frame. In accordance with the method of this invention tempered stock may be utilized in following right lines or easy curves of a die frame, while annealed stock is first shaped to the sharper or reëntrant curves and then tempered.

Instead of securing the cutting blades to the frame by fastening devices, it is in some cases preferable to weld the blades directly to the frame. This may be accomplished conveniently by forming a number of projections upon either the cutting blades or frame with or without corresponding depressions in the other member, holding the frame and blades in contact, and, by an electrical current, welding the two together at successive points of contact.

It will be apparent that together with the advantages already mentioned a die constructed according to the method above outlined, possesses the additional advantage that the blades may be removed from the frame for replacement in case a portion of the cutting edge becomes damaged, whereas in the older type of integral die a nicked or broken portion in the cutting edge destroyed the usefulness of the entire die.

Another important advantage of the method of making dies herein set forth, is that by forming the blade carrying face of the frame on a bevel, instead of perpendicular to the planes of the cutting edges, as in the dies heretofore discussed, dies may be produced in which the outlines of the two cutting edges are of the same shape but of different sizes. This feature of the invention may be embodied, to advantage, in "straight dies," that is to say, dies in which the two cutting edges would otherwise cut blanks of the same shape, as distinguished from "rights and lefts."

The advantages above stated and others incident to the invention, however, will be best understood and appreciated from the following description of several dies constructed in accordance with the invention and selected for purposes of illustration, together with the description of the method of their manufacture.

Figure 2:
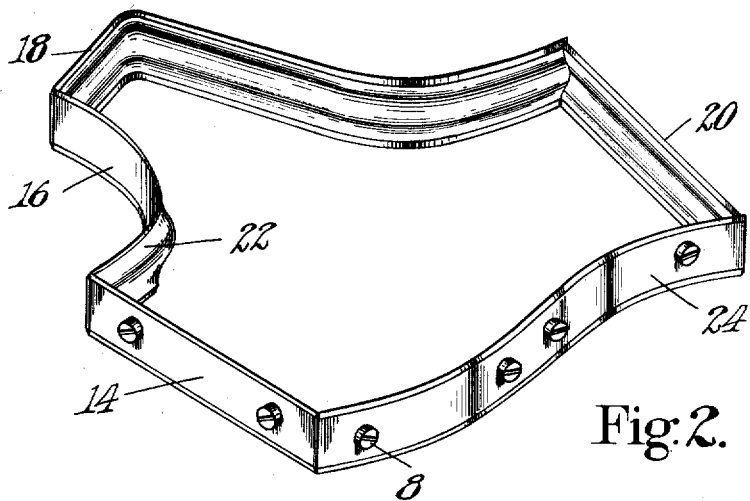
Figure 3:
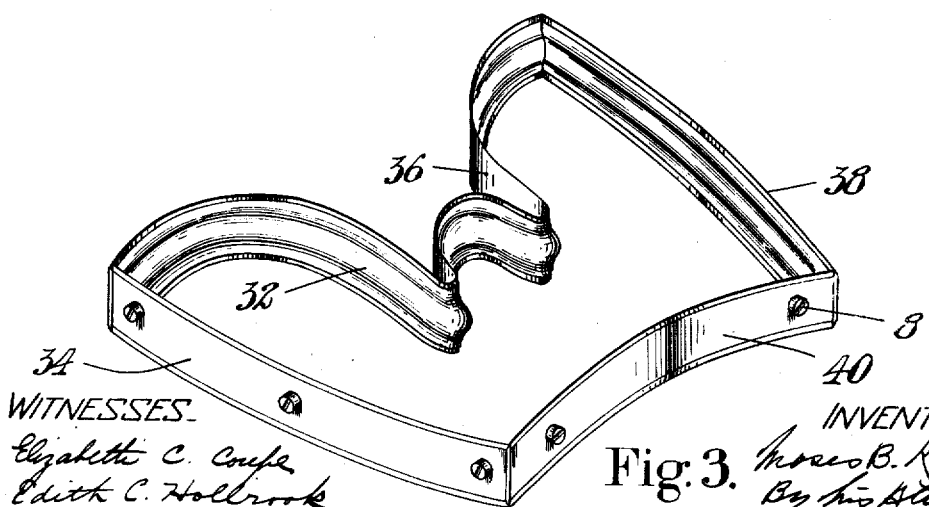
Figure 12:
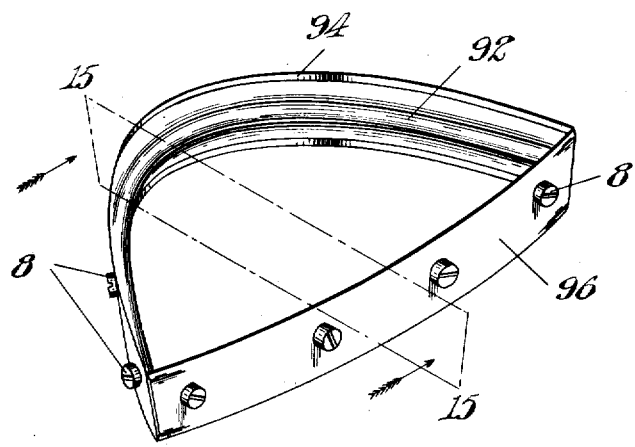
Figure 13:
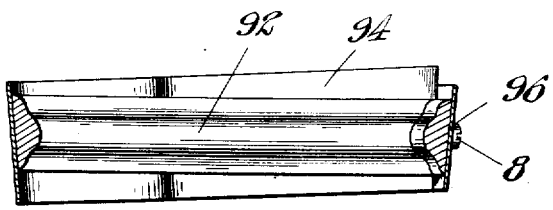
Figure 14:
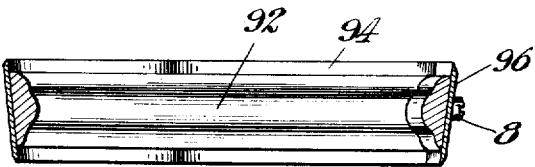

In the accompanying drawings illustrating the preferred manner of practising the method of this invention: Figure 1 is a perspective view of a die for cutting toe tip blanks constructed according to my improved method; Fig. 2 is a perspective view of a die for cutting quarter blanks; Fig. 3 is a perspective view of a die for cutting Blucher vamps; Fig. 4 is a perspective view of the die shown in Fig. 1 in process of construction; Figs. 5 to 7 illustrate various steps in the profiling of the frame; Fig. 8 is a perspective view of blades and frame ready for welding; Fig. 9 illustrates a templet having a bead partially bound about its edge; Fig. 10 illustrates a templet having a sectional bead partially bound about its edge; Fig. 11 shows a fragment of a die provided with a short piece having size indicating indentations; Fig. 12 is a perspective view of a die for cutting blanks of two different sizes; Fig. 13 is a sectional view of the die shown in Fig. 12 in process of construction taken on the plane 15—15 of this figure; Fig. 14 is a similar sectional view of the completed die shown in Figs. 12 and 13.

In cutting blanks for uppers it is often necessary to form the blank for a right shoe reversely as compared with the corresponding blank for the left shoe, or the blank for one side of a shoe reversely with respect to the blank for the other side, and a convenient and economical method of forming these blanks, known as right and left blanks, is by the use of a double edged die, the two cutting edges of which will cut similar but reversely shaped blanks, as will be obvious. I have shown in Fig. 1 a die of this description, as illustrating one embodiment of a die constructed in accordance with the present invention. In this die is employed a rigid, continuous frame 2, of such a cross section as to afford the operator an unobstructed view of the lower cutting edge of the die as it rests upon the leather, thus enabling him to detect imperfections occurring near the outline of the blank. The cross section of the frame is selected also with a view to furnishing the requisite stiffness to the die, and preferably will be a modified triangular section as shown in Figs. 13 and 14. Such cross section insures sufficient strength in the frame which at the same time offers an unobstructed view of the cutting edge of the die, and preferably extends from a relatively thick central portion into proximity with the edges of the blades, thus supporting and stiffening them. To the outer vertical surface of the frame 2 are secured the double edged cutting blades 6 and 4 beveled on their outer sides. The blade 6 is secured to the back or straighter side of the frame and the blade 4 is bent about the forward part of the frame, the ends of the blade 4 overlapping and, if desired, extending slightly past the ends of the blade 6 in order that the blanks cut by the die may be completely severed from the skin out of which they are cut. The cutting blades may be secured to the frame by any suitable means, for example, the screws 8, the only essential being that such securing points shall be sufficiently close together to insure that the blades are held in continuous contact with the outside of the frame. This is important since the outer surface of the frame is profiled to the desired outline and any departure of the blades from the surface would cause a corresponding defect in the outline of the blanks. The inner side of the ends of the blade 4 are soldered or brazed to the ends of the blade 6 to prevent separation of the blades and the resulting gap in the cutting outline of the die.

Fig. 2 illustrates a double edged die for cutting right and left quarter blanks, the die being constructed similarly to that shown in Fig. 1. In this die the frame is indicated by the reference character 22. The flexible blades 14, 16 18, 20 and 24 are secured to the vertical outer face of the frame by the screws 8 as in the case of the die first described.

A double edge die, constructed in accordance with my invention, for cutting right and left Blucher vamps is illustrated in Fig. 3. The frame 32 is formed by a method hereinafter described, the outer face thereof giving the outline of the vamp required. The flexible blades 34, 36, 38 and 40 are made to conform with the contour of the outer face of the frame and are secured thereto by the screws 8.

Fig. 12 illustrates a "straight die" the edges of which are adapted to cut different sizes of the blanks of the same shape. In this die the outer face of the frame 92 is beveled instead of being perpendicular to the planes of the cutting edges. The blades 94 and 96 are secured to the beveled face of the frame and as a result of the formation of the frame the outline of the upper cutting edge is larger than that of the lower cutting edge. By making the bevel of the proper degree the difference in the sizes of the blanks cut by the two edges may be made to equal one size or a half size; for example, one edge may cut a number 6 blank and the other a number 7 blank or a number 6½ blank.

Dies like those above described may be advantageously employed in a clicking press of the type disclosed in Letters Patent of the United States, No. 921,503, granted May 11, 1909, to Arthur Bates, although they are obviously not limited to use with this or any particular type of clicking press.

Several dies having been described in detail, a method of manufacturing them in accordance with the novel method of this invention will now be described.

A preferred method of constructing the frame, consists in casting it of a suitable metal or alloy and then shaping it accordingly to the required outline. For use in the casting operation it is desirable to provide a pattern having an outline as near as possible to the outline of the templet for the die allowing only for the necessary shrinkage and waste in finishing the casting.

The cardboard pattern giving the outline desired in the blanks to be cut and furnished by the shoe manufacturer, or the steel templet made from this pattern, may be utilized advantageously in forming the pattern from which the frames are to be cast. When it is desired to utilize the templet, for example, a bead having a cross section substantially that required in the frame, may be attached temporarily to the edges of the templet. This bead may be a strip of pliable material such as lead of the desired cross section, or it may be formed of sheet material bent to produce the desired cross section. A bead of sheet material may be rolled out rapidly and bound upon the templet by a beading machine of the usual commercial type. In Fig. 9 a templet 70 is shown with a bead 71 formed of sheet material partially bound about its edge. It will be seen that the vertical inner surface of the bead bears against the edge of the templet and takes its contour therefrom whereby the finished pattern is of exactly the shape desired in the finished frame, shrinkage and finishing being always allowed for by the thickness of the material forming the bead.

Instead of employing a bead extending continuously about the sharp curves and corners of a templet it may be preferable to make use of sections of bead at such points. Beveled corner sections are provided for use at the corners of the templet which are adapted to fit together and form a square corner in the bead. A continuous strip of bead may be bound upon the straight edges of the templet or those edges having a gradual curvature while the corners are formed by the beveled corner sections 73 as shown in Fig. 10. In providing the sharper or reentrant curves of a templet with a bead it is advantageous to employ a number of short sections 72 beveled on their side faces in order that the separate pieces used may constitute a continuous bead.

In forming molds for the frame from patterns constructed as just outlined, it will be seen that the body of the templet or cardboard pattern, in case that is used, will lie between the two halves of the mold. During the molding operation the two halves of the mold are separated by an amount equal to the thickness of the pattern or templet, this thickness being compensated for outside the bead by a layer of parting sand; so that when the pattern and the parting sand are removed the two halves of the mold will be nearer together by an amount equal to the thickness of the pattern or templet and the formation of a fin on the inside of the frame will be prevented. After the beaded templet has served its purpose as a pattern for the construction of the desired molds the bead may be removed readily from the templet, which is to be used subsequently in the process of profiling the frame.

Among the advantages of this method of forming a pattern for the frame are the great economy which is effected in producing a pattern for the frame directly from the templet and the added strength and stiffness of the pattern which are obtained during the molding operation by retaining the templet inside of the pattern bead.

Having constructed a frame as heretofore described, it is necessary to make the outline of the outer surface conform very accurately to the templet since this surface determines the outline of the cutting blades which are to be secured thereto. This step in the method is preferably accomplished by utilizing a profiling machine equipped with a milling cutter mounted to permit movement about the outline of the frame. To this end the frame is preferably first surfaced on one edge, preferably by disk grinding, to insure a continuous contact with a master plate 50 upon which it is placed after the grinding. The master plate 50 is provided with transverse and diagonal grooves 52 extending across it, as shown in Fig. 5, and has also two or more headed studs 57 disposed perpendicular thereto and adapted to slide in one or more of the transverse or diagonal grooves.

The templet 70 is drilled at two points to receive the studs 57. The location of these holes is selected roughly according to the shape and size of the frame but is independent of other considerations. The studs 57 are moved in the grooves 52 and within the skeleton frame till their upper ends project through the holes in the templet which now lies above the frame 22, and is temporarily connected to the master plate by the studs 57. The studs 57 are preferably provided with sleeves 58 for the purpose hereinafter explained. The frame 22 is then moved on the master plate and relatively to the templet, which is held stationary by the studs, till it assumes a symmetrical relation with the templet, its rough outer face lying a uniform distance outside of the outline of the templet. The templet is then removed and a molten metal having a low melting point, such as lead, for example, is poured upon the master plate inside the frame 22 and hardens within the frame and the grooves in the master plate, forming the core 55 and the ribs 56. The frame with its ribbed metallic mounting is next removed from the master plate and placed in a correspondingly grooved platen 60 of a profiling machine. The sleeves 58 which are cast with the core 55 facilitate the removal of the core from the studs 57 and master plate and the positioning of the core on the platen. Shouldered bolts 67 of the same diameter as the studs 57 and arranged to slide in the grooves 62 of the platen are inserted through the sleeves 58 in the core. The templet is then placed upon the upper ends of the shouldered bolts 67, and secured by nuts, as shown in Fig. 7. It will be seen that the previous relation of frame and templet on the master plate has now been exactly reproduced upon the platen of the profiling machine except that the templet is held a slight distance above the frame by the shouldered bolts. In Fig. 7 the tool spindle 83 of the profiling machine is shown provided with a milling cutter 80 and a grooved pilot wheel 81. The diameter of the pilot wheel at the bottom of the groove should be the same as the diameter of the cutter. The spindle or platen is movable in all directions by suitable mechanism under the control of the operator and by causing the cutter 80 to travel about the outline of the frame under the guidance of the pilot wheel 81 the outer face of the frame is made to correspond with the outline of the templet.

The process of securing the blades to a frame is indicated in Fig. 4 of the drawing in which the blade 6 is shown as secured to the frame and the blade 4 as partially secured to the frame. The cutting blades are formed of thin ribbon steel which may be obtained commercially in a tempered condition or in an annealed condition as may be desired. In constructing the die shown in this figure, the blade 6, which has to conform to the comparatively easy curvature of the rear portion of the frame, is formed of tempered stock and merely bent about the frame and secured thereto by attaching screws 8. When the curvature of a portion of the frame is so sharp that a blade of tempered stock cannot readily be fitted thereto it is preferable to employ blades of annealed stock which may be bent about and shaped to such portions of the frame and subsequently hardened, tempered and secured to the frame. In securing the blades to the frame, holes may first be punched in the blades at suitable points and then may be transferred to the frame, so that the holes in the blade and frame shall correspond, after which the blade may be secured by screws or bolts, as shown in Figs. 1, 2 and 3. To secure a continuous cutting edge at the corners of the frame and to assure that the blade shall fit closely to the frame near the corners and also to avoid weakening the blade by bending it at a sharp angle, the workman, when he reaches a corner, cuts off the end of the blade he is attaching flush with the adjoining face of the frame, takes another blade, overlaps with its end the end of the first blade and proceeds to attach the second blade in the same manner as the first. In fitting the blades at a corner the end of the second blade, as 4 in Fig. 4 is left projecting by the end of the first blade 6, in Fig. 4, and afterward filed back toward the corner. In order to effectually prevent the blades from opening at the corners when the die is in use it may be advisable to solder or braze together the adjacent ends of the blades.

It may be desirable to weld the blades directly to the frame and dispense with separate fastenings. This may be accomplished by forming projections on either the blades or the frame, preferably the frame, with or without corresponding depressions in the other member and welding the two together in an electric welding machine. As shown in Fig. 8 the projections are formed on the frame 22 by first drilling holes into the outer surface of the frame and then inserting the projecting plugs 23. Corresponding depressions 25 are formed in the inner faces of the blades and in the welding operation the two members are forced together and welded step by step at each point of contact by an electric current. This operation is so rapid and the heating so local that the temper of the blades is not effected except close about the contact point.

The ribbon steel from which the cutting blades are formed may be sharpened advantageously in the strip form before the blades are secured to the frame. It is desirable to perform the sharpening operation at this stage since it is possible to handle and sharpen a continuous strip of steel more conveniently and rapidly than a number of separate short pieces of the same material. However, on account of the greater convenience in handling the unsharpened stock it may be found preferable to secure the blades to the frame before the sharpening operation.

After the die has been completed by securing the blades to the frame, and by sharpening them in case they have been secured in an unsharpened condition, the die may be provided with any accessories with which it is to be equipped. Size indicating indentations may be formed in the cutting edge of the die if these are desired. Instead of forming such indentations directly in the cutting blades of a die it has been found advantageous to provide auxiliary pieces of stock, similar to that forming the blades, having the desired size indicating indentations formed therein, one of which auxiliary pieces may be embodied in the die and constitute a part of the cutting outline thereof. This arrangement is illustrated in Fig. 11 wherein 41 indicates a portion of the frame of a die and 48 a cutting blade secured thereto in any preferred manner. A number of short pieces of stock similar to that used for the blades are made up and kept in stock and indentations for cutting the different size and width indicating notches in the blanks are formed in the edges of the short pieces. In Fig. 11 one of these pieces 47 is shown having U-shaped and V-shaped indentations. The outer face of the frame 41 is recessed for the reception of the piece 47 by being cut away for a short distance and the piece 47 and blade 48 are secured together and to the frame by any desired fastening devices as the screws illustrated. The cutting edge of the main blade opposite to the indentations is cut away as shown at 49 in Fig. 11 in order to prevent the space between the main blade and the indentations from being filled with punchings as would be the case if the cutting edge of the main blade extended continuously past the indentations.

By the general method hereinabove described an upper cutting die adapted to cut exactly to a given pattern can be manufactured at a comparatively low cost. Moreover, this method is particularly adapted for the economical production of double edged dies since when the profile of the frame has once been determined the outline of both cutting edges of the blades has also been determined.

Another advantage of the novel die and method of producing it, herein described, is that a "straight die", that is a die which cuts blanks which are not "right and left", may be produced which will cut blanks of two different sizes but of the same shape, that is, one edge of the die will cut one size while the other edge will cut another size. This is accomplished, as shown in Figs. 13 and 14, by forming the exterior surface of the frame 92 with a bevel, so that the cutting blades 94 and 96 will not be normal to the planes in which the respective cutting edges lie, and the outline of one edge if projected on the plane of the other edge would not coincide therewith but be concentric. The beveled exterior face on the frame may conveniently be formed by substituting for the profiling cutter shown in Fig. 7 a cutter formed as a truncated cone so as to give the desired bevel to the exterior face of the frame. The cutting blades will be secured to the frame in the manner above described so that there will be produced a double edged die, the opposite cutting edges of which will form blanks of the same shape but of different sizes. In making a die in this manner for cutting two sizes of blanks, wider stock than otherwise is used for the cutting blades in order to make allowance for twisting of the blades in bending them around the beveled curves. This condition of the attached blades is clearly shown in Fig. 13. Where a blade is to be secured to a straight beveled part of a frame there will be no twisting so that blade stock of regular width may be employed.

After the blades have been secured to the frame their opposite edges are surface ground to bring them into planes substantially parallel to each other and to the edges of the frame and also at the proper predetermined distance apart. The die is completed by grinding the edges of the blade stock so secured to sharpen them for cutting.

Having described my invention, what I claim as new and desire to secure by Letters Patent is:—

1. The method of making dies which consists in forming a frame, securing blades of thin, flexible and tempered steel to the portions of the frame presenting right lines or easy curves, fitting blades of annealed steel to the portions of the frame presenting sharp or reëntrant curves, hardening and tempering said last named blades and then securing said blades to the frame.

2. The method of making dies which consists in forming a skeleton frame provided with a vertical face having an outline corresponding to the outline of the blank to be cut by the die, securing to the portions of said face presenting right lines or easy curves blades of thin, tempered steel, fitting blades of annealed steel to the portions of said face presenting sharp or reëntrant curves, hardening and tempering said last-named blades after they have been so fitted and then securing said blades to their respective portions of the frame.

3. The method of making skeleton frame dies which consists in conforming a lead strip of cross section suitable for the frame to the outline of a templet, casting a frame in a mold made with the conformed lead strip as a pattern, profiling said frame to said templet and securing to the former spring cutting blades.

4. The method of making skeleton frame dies which consists in conforming pliant material having a cross section suitable for the frame to the outline of a templet, casting a frame in a mold made with the conformed material as a pattern and securing cutting blades to said frame.

5. The method of making skeleton frame dies which consists in producing a templet having the desired outline, casting a frame from a pattern formed on said templet, profiling said frame to templet, and securing cutting blades to said frame.

6. The method of making skeleton frame dies which consists in producing a templet of sheet material, forming about the edges of said templet pliant material having approximately the cross section required in the frame, casting a frame in a mold made with the conformed strip as a pattern, and securing cutting blades to said frame.

7. The method of making skeleton frame dies which consists in producing a templet of sheet material, constructing a pattern by attaching temporarily a strip of pliant material to said templet about the outline thereof, the templet serving to strengthen and stiffen the pattern, casting a frame in a mold made with said pattern and securing cutting blades to said frame.

8. The method of making skeleton frame dies which consists in forming a pattern of sheet material having the outline desired in the die, attaching temporarily to the edge of such pattern a bead having substantially the cross section required in the frame, using said beaded pattern as a pattern from which to cast a frame and thereafter securing flexible cutting blades to the frame.

9. The method of making skeleton frame dies which consists in forming a pattern of sheet material having the outline desired in the die, attaching temporarily to the edge of such pattern a bead having its inner face bearing directly on and conforming to the edge of said pattern, using said beaded pattern as a pattern from which to cast a frame and thereafter securing flexible cutting blades to the outer face of the frame.

10. The method of making skeleton frame dies which consists in first forming a pattern of sheet material having the outline desired in the frame, attaching to the edge of such pattern a bead having substantially the cross section desired in the frame, using said beaded pattern as a pattern from which to cast said frames and finally mounting cutting blades on said frame.

11. The method of making skeleton frame dies which consists in forming a cardboard pattern having the outline desired in the die, constructing a corresponding metallic templet from said pattern, attaching to the edge of such templet a bead having substantially the cross section required in the frame, using said beaded templet as a pattern from which to cast a frame and thereafter securing flexible cutting blades to the frame.

12. The method of making skeleton frame dies which consists in constructing a frame in the rough, surfacing one edge, locating the frame on a grooved master plate in proper relation with a templet, filling the frame and grooves with molten metal, and thereafter locating the frame in a profiling machine by means of the ribs formed by the metal hardening in the grooves of the master plate, reëstablishing the relation of templet and frame, profiling the frame and finally securing cutting blades thereto.

13. The method of making die frames to which cutting blades of flexible material may be subsequently shaped and attached in order to form a complete die, which consists in casting a frame in the rough, forming a temporary reinforcing core within the frame, establishing a predetermined relation between the reinforced frame and a templet through the medium of the core, and then finishing the blade-shaping surface of the frame in accordance with the contour of the templet.

14. The method of making skeleton frame dies which consists in constructing a frame in the rough, forming a ribbed metal core for said frame, locating said frame on the grooved platen of a profiling machine by means of said ribs, profiling said frame and thereafter securing cutting blades thereto.

15. The method of profiling frames for skeleton frame dies which consists in drilling a suitable templet to receive studs movable over a grooved master plate, locating the rough frame on the master plate symmetrically with respect to the drilled templet, filling the frame and grooves with molten metal, locating the frame on a grooved platen by means of the ribs formed by the metal hardening in the grooves of the master plate, relocating the templet in its previous symmetrical relation with the frame, and guiding a cutting tool about the frame by the templet.

16. The method of profiling frames for skeleton frame dies which consists in placing a rough frame on a master plate having vertical studs and sleeves surrounding said studs, filling the frame with molten metal which hardens forming a core with said sleeves embedded therein, placing said frame and metal core on the platen of a profiling machine, locating a templet symmetrically with respect to said frame by means of bolts projecting from said platen through the sleeves embedded in said core and guiding a cutting tool about the frame by the templet.

17. The method of profiling frames for skeleton frame dies which consists in placing a rough frame on a master plate, locating a templet symmetrically with respect to the frame, providing a mounting for said frame, placing frame and mounting in a profiling machine, relocating said templet with respect to said frame and moving a cutting tool about said frame guided by the templet.

18. The method of making skeleton frame dies which consists in forming a pattern of sheet material having the outline desired in the die, attaching to the edge of such pattern a bead having the cross section required in the frame, and of such thickness that the excess size of the beaded pattern over the unbeaded pattern shall constitute a proper allowance for shrinkage and finishing, using said beaded pattern as a pattern from which to cast a frame and thereafter securing cutting blades to the frame.

19. The method of making skeleton frame dies which consists in forming a pattern of sheet material having the outline desired in the die, attaching temporarily to the edge of such pattern a bead and thereby increasing the size of the pattern by an amount constituting a proper allowance for shrinkage and finishing, using said beaded pattern as a pattern from which to cast a frame thereafter reducing the frame to coincide in outline with the unbeaded pattern and finally mounting cutting blades on the frame.

20. The method of making skeleton frame dies which consists in forming a templet having the outline desired from sheet material, attaching temporarily to the edges of said templet a sectional bead having the cross section required in the frame, casting a frame with the beaded templet as a pattern, and subsequently securing cutting blades to said frame.

21. The method of making skeleton frame dies which consists in forming a templet having the outline desired from sheet material, attaching temporarily to the edges of said templet a bead comprising long and short sections, said short sections being beveled on their side faces to allow them to form a continuous surface upon the curved portions of the templet, casting a frame with the beaded templet as a pattern and finally securing blades to the frame.

22. The method of making skeleton frame dies which consists in forming a templet having the outline desired in the frame, attaching temporarily to the edges of said templet a bead comprising long and short sections, securing long sections of the bead to the straight and gradually curving edges of the templet and short sections to the sharply curving edges thereof, casting a frame with the beaded templet as a pattern and finally securing blades to the frame.

23. The method of making skeleton frame dies which consists in forming a templet having the outline desired in the frame, attaching temporarily to the straight and gradually curving edges of said templet strips of bead and at the corners of the templets employing short beveled sections having the same cross section as the strips and forming therewith a continuous bead about the edges of the templet, casting a frame with the beaded templet as a pattern and finally securing blades to the frame.

24. The method of making skeleton frames for dies which consists in constructing a frame in the rough, filling the interior of said frame with molten metal which hardens therein forming a solid core, thereafter profiling the face of said frame, the frame being meantime reinforced and supported by the metallic core and then removing the core.

25. The method of making skeleton frames for dies which consists in constructing a frame in the rough, forming a solid core within said frame for reinforcing and supporting the latter, profiling the frame and thereafter removing the core.

26. The method of making skeleton frame dies which consists in constructing a rigid frame having beveled faces, attaching cutting blades of ribbon steel to the straight beveled portions of said frame and blades of a wider ribbon steel to the curved beveled portions of said frame, surfacing both edges of the attached blades, and subsequently sharpening the blades.

In testimony whereof I have signed my name to this specification in the presence of two subscribing witnesses.

MOSES B. KAVEN.

Witnesses:
CHESTER E. ROGERS,
LEONARD M. JOHNSON.

It is hereby certified that in Letters Patent No. 1,095,116, granted April 28, 1914, upon the application of Moses B. Kaven, of Beverly, Massachusetts, for an improvement in "Methods of Making Dies," an error appears in the printed specification requiring correction as follows: Page 5, line 125, after the word "curves" insert the words *of the frame;* and that the said Letters Patent should be read with this correction therein that the same may conform to the record of the case in the Patent Office.

Signed and sealed this 6th day of October, A. D., 1914.

[SEAL.] R. F. WHITEHEAD,
*Acting Commissioner of Patents.*